United States Patent
Ohji et al.

(10) Patent No.: US 6,948,737 B2
(45) Date of Patent: Sep. 27, 2005

(54) GAS GENERATOR FOR AIR BAG

(75) Inventors: Nobuyuki Ohji, Hyogo (JP); Yoshihiro Nakashima, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 226 days.

(21) Appl. No.: 10/325,924

(22) Filed: Dec. 23, 2002

(65) Prior Publication Data
US 2005/0151356 A1    Jul. 14, 2005

Related U.S. Application Data

(60) Provisional application No. 60/360,006, filed on Feb. 28, 2002.

(30) Foreign Application Priority Data

Dec. 26, 2001  (JP) .............................. 2001-393921

(51) Int. Cl.[7] .............................................. B60R 21/26
(52) U.S. Cl. ....................... 280/736; 280/741; 280/742
(58) Field of Search ................................ 280/741, 736, 280/742

(56) References Cited

U.S. PATENT DOCUMENTS

| 4,950,458 | A | 8/1990 | Cunningham |
|---|---|---|---|
| 4,998,751 | A | 3/1991 | Paxton et al. |
| 5,513,879 | A | 5/1996 | Patel et al. |
| 6,068,291 | A * | 5/2000 | Lebaudy et al. ............ 280/736 |
| 6,143,103 | A * | 11/2000 | Ryder .......................... 149/46 |
| 6,412,815 | B1 | 7/2002 | Nakashima et al. |
| 2002/0167155 | A1 | 11/2002 | Nakashima et al. |

FOREIGN PATENT DOCUMENTS

| JP | 08-207696 A | 8/1996 |
|---|---|---|
| JP | 11-59318 A | 3/1999 |
| JP | 2001-97176 A | 4/2001 |
| JP | 2001-130368 A | 5/2001 |
| JP | 2001-163169 A | 6/2001 |
| JP | 2001-199303 A | 7/2001 |
| JP | 2001-199304 A | 7/2001 |

* cited by examiner

*Primary Examiner*—Eric Culbreth
(74) *Attorney, Agent, or Firm*—Birch, Stewart, Kolasch & Birch, LLP (57) ABSTRACT

A gas generator for an air bag has gas discharge ports closed by a seal tape and has two different opening areas. When a pressure inside the gas generator increases due to combustion of a gas generating agent, a gas discharge port having a larger area is first opened to decrease the internal pressure. Subsequently, as the pressure further increases a gas discharging port having a smaller area is opened to decrease the internal pressure.

11 Claims, 6 Drawing Sheets

GAS GENERATOR FOR AIR BAG

This application claims priority on provisional Application No. 60/360,006 filed on Feb. 28, 2002 and on Japanese Application No. 2001-393921 filed in Japan on Dec. 26, 2001, the entire contents of which are hereby incorporated by reference.

BACKGROUND OF THE INVENTION

1. Field of the Invention

The present invention relates to a gas generator for an air bag, in which, when gas generating agents are burnt in two stages, a rising rate of a pressure becomes moderate, a change in pressure is small and an impact to a vehicle occupant can be small. The present invention is also directed to an air bag system that incorporates the gas generator.

2. Description of the Related Art

An air bag system mounted on various kinds of vehicles and the like such as automobiles, aims to hold an occupant by an air bag (a bag body) rapidly inflated by a gas when the vehicle collides at a high speed and to prevent the occupant from crashing into a hard portion inside the vehicle such as a steering wheel, and a windscreen due to an inertia, and getting injured. This kind of air bag system generally comprises a gas generator actuated upon a collision of the vehicle to discharge a gas, and an air bag to which the gas is introduced to inflate.

It is desirable that such an air bag system can safely restrain the occupant even when the frame of the occupant (for example, whether a sitting height is long or short, whether an adult or a child, and the like), a sitting posture (for example, a posture of holding tightly on the steering wheel) and the like are different. For this reason, a so-called dual inflator, which inflates an air bag in two stages by generating a gas in two stages, has been employed.

Gas generators applied to such an air bag system are disclosed in JP-A 08-207696, U.S. Pat. No. 4,998,751, U.S. Pat. No. 4,950,458, and the like. JP-A 08-207696 discloses a gas generator in which two kinds of gas generating agent capsules are ignited by one igniter to generate a gas in two stages. U.S. Pat. No. 4,998,751 and U.S. Pat. No. 4,950,458 disclose gas generators in which two combustion chambers are provided to control actuation of the gas generator, and a gas is generated in two stages due to an expanded flame of a gas generating agent.

SUMMARY OF THE INVENTION

An object of the present invention is to provide a gas generator for an air bag in which, when gas generating agents are burnt in two stages to inflate an air bag in two stages, a pressure increase due to the gas generating agent burnt by actuation of a first-stage igniter and second-stage igniter, namely, a change in inflating speed of the air bag can be small, and is also directed to an air bag system using the same.

In order to solve the above problem, as a result of accumulated studies, the inventors of the present invention have found that, by associating a rupturing pressure of a seal tape closing a gas discharging port with a shape of a gas generating agent, changes in discharged amounts of the gas from the gas generator can be almost equal and changes in inflating rates of the air bag can be almost equal regardless of the igniting and burning timings of the second-stage igniter (igniters activated with a delay) when the second-stage igniter is activated during combustion of one of the gas generating agents due to activation of the first-stage igniter (one igniter activated first).

The present invention provides, as one means for solving the above problem, a gas generator for an air bag comprising, in a housing having a plurality of gas discharging ports closed by a seal tape(s), two combustion chambers storing gas generating agents and two igniters for independently igniting and burning the gas generating agents stored in each of the two combustion chambers, and activating the two igniters at a staggered timing, wherein the plurality of gas discharging ports closed by the seal tape comprises a gas discharging port opened when the seal tape is ruptured by activation of a first-stage igniter and a gas discharging port opened when the seal tape is ruptured not by the activation of a first-stage igniter but by activation of a second-stage igniter, a gas generating agent is cylindrical in shape and has at least a single hole in the longitudinal direction, and an inner diameter (d) and a length (L) thereof satisfy the following equation:

$$L/d \leq 3.5; \text{ and}$$

when the first-stage igniter is ignited, a portion of the seal tape or seal tapes are first ruptured, then another portion or all of the unruptured are ruptured with a delay, and a ratio ($P2/P1$) of a rupturing pressure ($P1$) of the first ruptured seal tape and a rupturing pressure ($P2$) of the seal tape ruptured with delay is 1.1 to 1.5.

As described above, the gas generator of the present invention can exhibit the following specific operational effect by associating the shape of the gas generating agent with the rupturing pressure of the seal tape and making them act correlatively.

It is known that a burning rate when burning a solid gas generating agent differs slightly due to a composition ratio or the like, but it is generally influenced by a pressure, and the burning rate increases as the pressure rises. Therefore, after an internal pressure inside a housing increases due to combustion of the gas generating agents burnt by activation of a first-stage igniter, the pressure decreases when the gas discharging port is opened due to the rupture of part of the seal tape. This disturbs the combustion of the gas generating agent and the burning rate is temporarily decreased. However, the combustion still continues and the internal pressure starts increasing again to a degree such that part of the unruptured seal tape is ruptured to open the gas discharging port. Consequently, the housing internal pressure decreases once again to disturb the combustion of the gas generating agent, so that the burning rate decreases once again.

As mentioned above, by setting $P2/P1$ in the range of 1.1 to 1.5, the increase in the internal pressure inside the housing due to combustion of the gas generating agent and the decrease in the housing internal pressure due to the gas discharging ports opened by the ruptured seal tape; in other words, disturbance on the combustion of the gas generating agents is repeated at intervals, so that only a little change in an amount of generating gas with time is obtained, and the gas generating amount is approximately constant. Such a state is maintained, and therefore, in case of activating the second-stage igniter to burn the other gas generating agent, a change with time in gas discharging amount from the gas generator can be approximately equal regardless of the timing of activating the second-stage igniter.

Further, the shape of the gas generating agent also contributes to an exhibition of the above-described operational effect. When a surface area per unit weight of the gas generating agent is large, the gas generating agent is burnt at once to generate a gas at the time of activating the first-stage igniter, and thereby, a time interval between rupture of the seal tape ruptured first and rupture of the seal tape ruptured with a delay at the time of activating the first-stage igniter becomes shorter, and the mechanism of once decreasing the internal pressure of the housing does not substantially work. However, when the gas generating agent satisfies L/d≧3.5, an ignition flame does not reach the vicinity of the center of the hole in the gas generating agent at the initial stage of the combustion and a generated amount of the gas is small because the flame contacts only limited portion of the gas generating agent. When the combustion advances and the ignition flame reaches the inside of the hole, the unburnt portion of the gas generating agent is burnt to increase a generated amount of the gas. Accordingly, in such a combustion mechanism, the gas generating agent is never burnt at once and duration of combustion can be long. Thereby, the above-described operational effect can be exhibited by combining L/d≧3.5 (preferably, L/d≧5) with P2/P1=1.1 to 1.5 (preferably, 1.2 to 1.4) and making them act correlatively. In this case, a rupturing pressure can be obtained by the following formula:

Rupturing pressure=σb×(4t/D)

(In the formula, σb represents a tensile strength of a seal tape, t represents a thickness (mm) of the seal tape, and D represents a diameter (mm) of a discharging port.)

In order to adjust a rupturing pressure of such a seal tape, a method of making a plurality of gas discharging ports to have two different diameters such as a larger diameter and a smaller diameter, to have three different diameters such as a larger diameter, a middle-sized diameter, and a smaller diameter or further to have at least four different diameters, a method of adjusting the thickness, material, size or the like of the seal tape to change the rupturing strength in two stages, three stages or four or more stages, a method obtained by combining the above-described two methods or the like.

In the above-described invention, a hole provided in the gas generating agent may be formed in the longitudinal direction (in the axial direction), or it can be formed as a through hole, but a through hole is preferable. Preferably, when the gas generating agent has two or more holes, the inner diameters of all holes are formed equally and in the same direction. The inner diameter (d in L/d) is an inner diameter of one hole. Also, it is preferable that the length of the gas generating agent is not more than 6 mm.

In the above-described invention, the rupturing pressure (P1) of the seal tape ruptured first by actuation of the first-stage igniter is preferably not more than 10,000 kPa, and more preferably not more than 8,500 kPa. In view of a pressure tightness of the housing, and an inflation starting time of the air bag or the like, it is desirable that the above-described rupturing pressure is the upper limit.

In a gas generator for an air bag that meets the above requirements, a rupturing time-lag between the seal tape first ruptured and the seal tape ruptured with a delay during the actuation of the first-stage igniter is 1.5 milliseconds or more, and a change in inflating speed of the air bag becomes small by securing this time-lag. Since the increase and the decrease in the internal pressure of the housing must be repeated many times as described above, the numerical value of 1.5 milliseconds or more is a time period required for securing the increasing and decreasing.

In the above-described invention, the gas generator for an air bag is adjusted to the temperature of 20° C. and placed in a sealed system with a volume of 60 liters, and only the first-stage igniter (one of the igniters to be ignited first) is ignited and only the gas generating agent stored in one of the combustion chambers is ignited and burnt. At that time, a pressure in the sealed system at the time of 0.5×Tpmax from the time when the ignition current is applied is preferably 0.55×Pmax to 0.75×Pmax if a period up to the peak (the peak of the pressure) when the internal pressure of the sealed system becomes the maximum from the time when the igniter is activated (the ignition current is applied) is Tpmax, and a pressure inside the sealed system at the peak of the pressure is Pmax.

In the conventional gas generator, a reducing rate of a percentage of the unburnt part of the gas generating agent with a passage of time is large, and the internal pressure of the housing becomes lower in the latter combustion, so that the combustion tends to be disturbed. For this reason, in the latter combustion, a generated amount of the gas is reduced and the pressure change in the sealed system becomes small. Therefore, when the pressure change in the sealed system is shown in a graph at intervals of about 100 milliseconds from the ignition, a pressure curve draws an upward convex (a convex toward the higher pressure value) curve. However, when a pressure in the sealed system in a half of the time (0.5×Tpmax) of the peak of the pressure (Tpmax) is in the range of 0.55×Pmax to 0.75×Pmax, the pressure curve is not a conventional upward convex curve but it rises in an approximately linear shape. Then, even though the second-stage igniter (the other igniter activated with a time-lag) is activated to generate a combustion gas while the curve is rising (that is, while one of the gas generating agents ignited and burnt by activation of the first-stage igniter is being burnt), a rising rate (pressure/time) of pressure with the passage of time in the sealed system is not extreme but almost constant, regardless of the ignition timing of the second-stage igniter, so that the change in the rising rate can be small.

In the above-described invention, the above-described gas generator for an air bag is adjusted to the temperature of 20° C. and placed in a sealed system having a volume of 60 liters, and only the first-stage igniter is ignited and only the gas generating agent stored in one of the combustion chambers is ignited and burnt. Thereafter, the second-stage igniter is ignited 10 milliseconds or 30 milliseconds after the activation of the first-stage igniter (after the ignition current is applied), and the gas generating agent of the other combustion chamber is ignited and burnt. At that time, preferably, a condition of the change in the pressure inside sealed system after the first-stage and second-stage igniters are ignited satisfies the following the formula (I):

$$0.5 \leq \Delta P30/\Delta P10 \leq 1 \quad (I)$$

(In the formula, Δ P10 represents an amount of pressure change for 10 milliseconds from a time when the second-stage igniter is activated 10 milliseconds after activation of the first-stage igniter, and Δ P30 represents an amount of pressure change for 10 milliseconds from a time when the second-stage igniter is activated 30 milliseconds after the activation of the first-stage igniter.)

When the gas generator satisfies formula (I) in this manner, in a gas generator assembled in to an air bag system in an automobile, even though the second-stage igniter is activated with a time-lag during one of the gas generating agent is being burnt by the activation of the first-stage igniter, a rising rate of the pressure (pressure/time) with the passage of time inside the sealed system is not extreme but almost constant, regardless of the ignition timing of the second-stage igniter, so that the change in the rising rate can be small.

In the above-described invention, the above-described gas generator for an air bag is adjusted to the temperature of 20° C. and placed in a sealed system with a volume of 60 liters, and only the first-stage igniter is ignited and only the gas generating agent stored in one of the combustion chambers is ignited and burnt. Thereafter, the second-stage igniter is ignited 30 milliseconds after the activation of the former igniter (after the ignition current is applied), and the gas generating agent of the other combustion chamber is ignited and burnt. At that time, preferably, a condition of the change in the pressure inside sealed system after the first-stage and second-stage igniters are ignited satisfies the following the formula (II):

$$1.1 < \Delta P30\text{--}40/\Delta P20\text{--}30 < 1.4 \qquad (II)$$

(In the formula, $\Delta P20\text{--}30$ represents an amount of pressure change (an absolute value) in the sealed system for 20 to 30 milliseconds after the activation of the first-stage igniter, and $\Delta P30\text{--}40$ represents an amount of pressure change (an absolute value) in the sealed system for 30 to 40 milliseconds after activation of the first-stage igniter.)

When the gas generator satisfies the formula (II) in this manner, in a gas generator assembled into an air bag system of an automobile, even though the two igniters are activated with a time-lag, a rising rate of the pressure (pressure/time) with the passage of time inside the sealed system is not extreme but almost constant, regardless of the ignition timing of the second-stage igniter, so that the change in the rising rate can be small.

The present invention provides, as another means for solving the above-described problem, a gas generator for an air bag comprising, in a housing having a plurality of gas discharging ports closed by a seal tape, two combustion chambers storing a gas generating agent and two igniters adapted to ignite and burn the gas generating agents stored in the two combustion chambers, the two igniters being adapted to be activated with a time-lag, and a plurality of the gas discharging ports being closed by the seal tape and including a hole opened by the seal tape ruptured due to activation of the first-stage igniter and a hole opened by the seal tape ruptured not due to activation of the first-stage igniter but due to activation of the second-stage igniter, wherein the above-described gas generator is adjusted to the temperature of 20° C. and placed in a sealed system, and only the first-stage igniter (one of the igniters to be ignited first) is ignited and only the gas generating agent stored in one of the combustion chambers is ignited and burnt. At that time, a pressure in the sealed system at the time of 0.5×Tpmax from the time when the ignition current is applied is preferably 0.55×Pmax to 0.75×Pmax if a period up to the peak (the peak of the pressure) when the internal pressure of the sealed system becomes the maximum from the time when the igniter is activated (the ignition current is applied) is Tpmax, and a pressure inside the sealed system at the peak of the pressure is Pmax.

As described above, in the case of a pressure in the sealed system at the half time (0.5×Tpmax) of the peak of the pressure (Tpmax) being in the range of 0.55×Pmax to 0.75×Pmax, a rising rate (pressure/time) of pressure with the passage of time in the sealed system is not extreme but almost constant, so that the change in the rising rate can be small, regardless of the ignition timing of the second-stage igniter, even though the second-stage igniter is activated to generate a combustion gas while one of the gas generating agents ignited and burnt by activation of the first-stage igniter is being burnt.

Further, the present invention provides, as another solving means for the above-described problem, an air bag system comprising a gas generator for an air bag, an impact sensor which detects an impact to actuate the gas generator, an air bag which introduces a gas generated in the gas generator to inflate, and a module case which accommodates the air bag, wherein the gas generator for an air bag is the above-described gas generator for an air bag.

According to the gas generator for an air bag, the change in inflating rate of an air bag can be small when the first-stage and second-stage igniters are activated, so that with the gas generator assembled to an air bag system, an occupant can be protected from the impact of the collision of an automobile and the occupant is prevented from being injured due to a rapid inflation of an air bag.

DETAILED DESCRIPTION OF THE INVENTION

Figure 1:
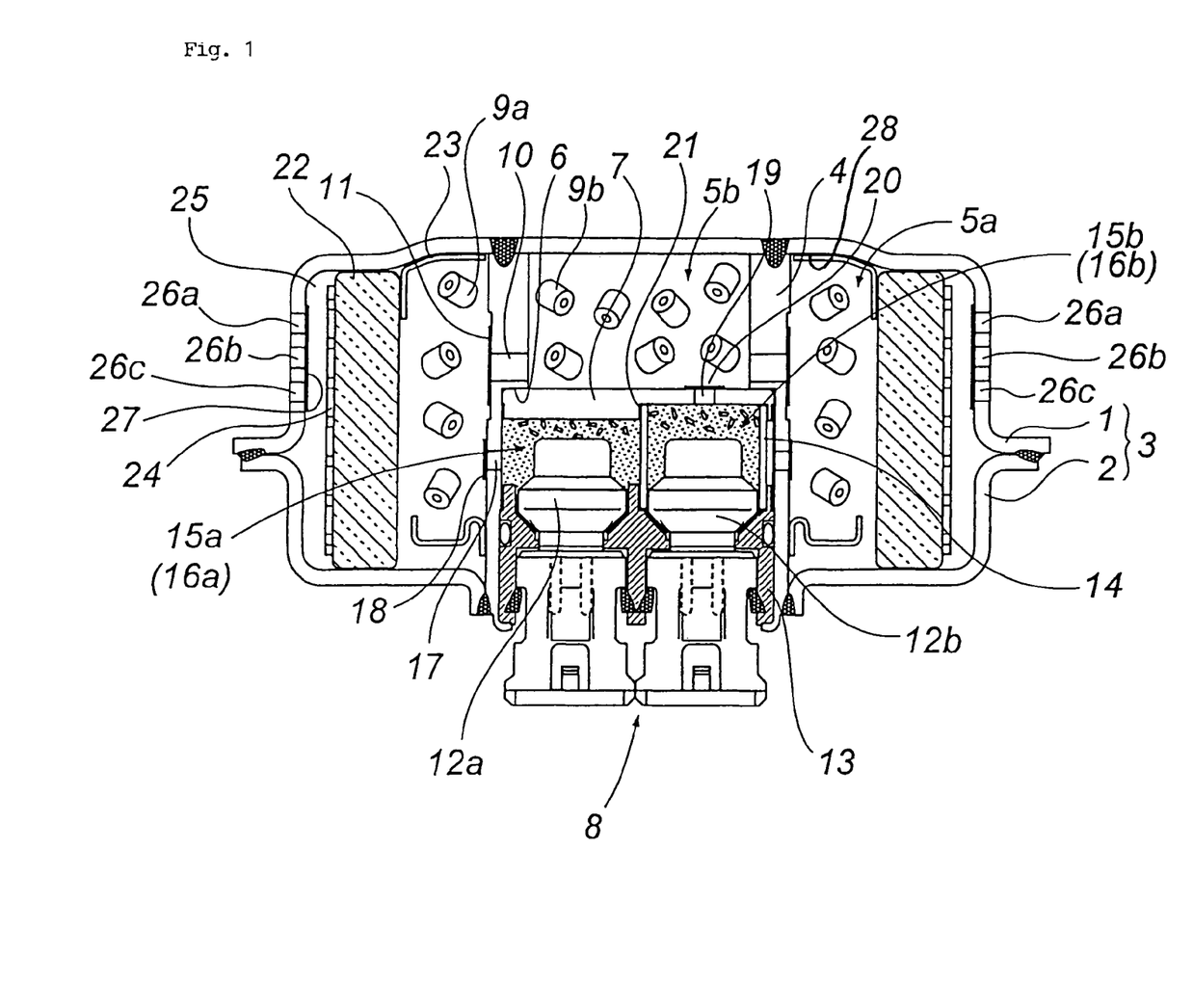
FIG. 1 is a sectional view of a gas generator of the present invention.

An embodiment of the present invention will be described as follows with reference to the drawings. FIG. 1 is a vertical cross sectional view of a gas generator for an air bag of the embodiment, which has a structure particularly suitable for installing into a driver side.

In the gas generator, an outer shell is formed with a housing 3, and the housing 3 is formed by joining a diffuser shell 1 having a gas discharging port(s) and a closure shell 2 forming an inner accommodating space with the diffuser shell 1.

In the housing 3, an inner cylindrical member 4 is disposed inside the housing 3 to axially partition the interior of the housing 3, and an annular coolant/filter 22 is disposed radially outside the inner cylindrical member 4 to surround the inner cylindrical member 4.

A first combustion chamber 5a is formed in a space surrounded by the housing 3, the inner cylindrical member 4 and the coolant/filter 22, and the interior thereof is charged with a single-perforated cylindrical first gas generating agent 9a. In the single-perforated cylindrical first gas generating agent 9a, a ratio of the inner diameter (d) and the length (L), i.e., L/d is set to not less than 3.5 and the length is set to 4 mm.

The interior of the inner cylindrical member 4 is divided into two chambers (an upper space and a lower space) in the axial direction (the vertical direction in FIG. 1) by a partition wall 7. The partition wall 7 is substantially flat in shape, and it is mounted in a stepped notch portion 6 provided inside the inner cylindrical member 4.

A second combustion chamber 5b is formed in the upper space in the inner cylindrical member 4, namely a space surrounded by the diffuser shell 1, the inner cylindrical member 4 and the partition wall 7, and it is charged with a required amount of a single-perforated cylindrical second gas generating agent 9b. The first combustion chamber 5a and the second combustion chamber 5b are concentrically provided in the housing 3 and arranged in adjacent to each other in the radial direction of the housing 3. In the second gas generating agent 9b, a ratio of the inner diameter (d) and the length (L), i.e., L/d is set to not less than 3.5 and the length is set to 4 mm.

A through hole 10 is provided in the inner cylinder member 4 separating the first combustion chamber 5a and the second combustion chamber 5b from each other and it is closed by a seal tape 11. Further, an opening area of the through hole 10 is formed larger than these of the gas discharging ports 26a, 26b, 26c, and the through hole 10 does not function to control an internal pressure of the combustion chamber 5b.

An ignition means accommodating chamber 8 is formed in the lower space in the inner cylinder member 4, namely a space formed by the inner cylindrical member 4 and the partition wall 7, and ignition means activated by an impact is accommodated therein.

The ignition means comprises two electric ignition type igniters 12a and 12b activated by an activating signal outputted on the basis of impact-detection by a sensor, and the igniters 12a and 12b are provided in parallel to each other in one initiator collar 13, exposing head portions thereof. As mentioned above, the igniters 12a and 12b are provided with a single initiator collar 13 formed as a single member, so that they are mounted to the gas generator easily.

A substantially cylindrical dividing cylinder 14 is arranged in a space between the initiator collar 13 and the partition wall 7 to surround one igniter 12b (hereinafter, referred to as a "second igniter 12b"), a first transfer charge accommodating chamber 15a is formed in the outside thereof and a second transfer charge accommodating chamber 15b is formed in the inside thereof respectively, and the first igniter 12a and the second igniter 12b and a first transfer charge 16a and a second transfer charge 16b constituting the ignition means together with the igniters are stored in the respective accommodating chambers. The dividing cylinder 14 is arranged in a stepped notch portion 21 provided in the partition wall 7. With this dividing cylinder 14, ignition flames generated by the first igniter 12a and the first transfer charge 16a do not reach the second transfer charge 16b.

A first frame-transferring hole 17 closed by a seal tape 18 is provided in the inner cylindrical member 4, and when the first transfer charge 16a is burnt, the seal tape 18 closing the first flame-transferring holes 17 is ruptured to allow communication between the first transfer charge accommodating chamber 15a and the first combustion chamber 5a.

A second frame-transferring hole 19 closed by a seal tape 20 is provided in the partition wall 7, and when the second transfer charge 16b is burnt, the seal tape 20 closing the second flame-transferring holes 19 is ruptured to allow communication between the second transferring charge accommodating chamber 15b and the second combustion chamber 5b.

A coolant/filter 22 for purifying and cooling the combustion gas generated by the combustion of the first and second gas generating agents 9a and 9b is disposed in the housing 3, and an inner peripheral surface thereof in the diffuser shell 1 side is covered with a short-pass preventing member 23 preventing the combustion gas from passing between an (upper) end surface of the coolant/filter 22 and an inner surface 28 of a ceiling portion of the diffuser shell 1.

An outer layer 24 for suppressing an outward expansion of the coolant/filter 22 caused by passing of the combustion gas or the like is arranged outside the coolant/filter 22. The outer layer 24 can be formed of, for example, a layered wire mesh body, a porous cylindrical member having a plurality of through holes on a peripheral wall surface or a belt-like suppressing layer obtained by forming a belt-like member with a predetermined width into an annular shape. A gap 25 is further formed outside the outer layer 24 so that the combustion gas can pass through the entire surface of the coolant/filter 22.

A peripheral wall portion of the diffuser shell 1 is provided with three kinds of gas discharging ports 26a, 26b, and 26c having different diameters, and the number of the respective discharging ports can be set equal or different.

A seal tape 27 is attached to the discharging ports 26a, 26b, and 26c from an inner peripheral surface of the peripheral wall portion of the diffuser shell 1 in order to protect the gas generating agent against influence of external environment such as moisture outside the housing. The seal tape 27 is wide enough to have a margin even though it closes at one time the three kinds of gas discharging ports arranged in the axial direction of the gas generator. Preferably, the tape is wider by the margin of 2 to 3 mm, which is measured from the upper end or the lower end of the respective gas discharging ports 26a, 26b, and 26c to the upper end or the lower end of the seal tape 27. For example, a seal tape comprising an aluminum seal layer having a thickness of 20 to 200 μm and a bonding layer or an adhesive layer having a thickness of 5 to 100 μm is used.

In FIG. 1, among the opening diameters of the gas discharging ports 26a, 26b, and 26c, the diameter of the port 26a is the largest, and they are set in order of 26a>26b>26c. Thereby, the seal tape 27 closing the respective ports is ruptured in the order of the gas discharging ports 26a, 26b, and 26c, so that the gas discharging ports are opened in the order of the gas discharging ports 26a, 26b, and 26c to discharge gases. At this time, the gas discharging ports 26a and 26b are opened by activation of the first igniter 12a and the gas discharging port 26c is opened by activation of the second igniter 12b.

Arrangement of the gas discharging ports 26a, 26b, and 26c is not particularly limited, and they may be arranged in the axial direction of the housing 3 as shown in the drawing, or they may be arranged alternately and circumferentially in the peripheral wall of the diffuser shell 1.

Next, an operation of the gas generator for an air bag shown in FIG. 1 will be explained. When the first igniter 12a is ignited (activated), the first transfer charge 16a in the first transfer charge accommodating chamber 15a is ignited and burnt by a flame thereof, and then, the flame breaks the seal tape 18 to pass through the first flame-transferring hole 17 and ignites and burns the single-perforated cylindrical first gas generating agent 9a stored in the first combustion chamber 5a. Thereafter, the combustion gas having a high temperature generated by ignition and combustion of the first gas generating agent 9a flows into the gap 25 after passing through the coolant/filter 22. At this time, the seal tape 27 covering the gas discharging port 26a is first ruptured due to increase of an internal pressure of the housing caused thereby to open the gas discharging port 26a. Here, the internal pressure of the housing is temporarily decreased, so that the combustion of the first gas generating agent 9a is temporarily disturbed. However, the combustion is disturbed just temporarily, and the subsequent combustion of the first gas generating agent 9a is continued, which increases the internal pressure of the housing. When the internal pressure of the housing increases to rupture the seal tape 27 covering the gas discharging port 26b, the seal tape 27 is ruptured to open the gas discharging port 26b.

Next, when the second igniter 12b is activated with a delay, the second transfer charge 16b in the second transfer charge accommodating chamber 15b is ignited and burnt by a flame thereof, and then, the flame breaks the seal tape 20 and passes through the second flame-transferring hole 19, and ignites and burns the single-perforated cylindrical second gas generating agent 9b stored in the second combustion chamber 5b. Thereafter, a combustion gas having a high temperature generated by ignition and combustion of the second gas generating agent 9b breaks the seal tape 11 and passes through the through hole 10 and flows into the first combustion chamber 5a. The combustion gas flows into the gap 25 after passing through the coolant/filter 22, and the seal tape 27 covering the gas discharging port 26c is ruptured to open the gas discharging port 26c.

In this course, when the first gas generating agent 9a in the first combustion chamber 5a is burnt, the rupturing pressure (P1) of the seal tape 27 covering the gas discharging port 26a is set to not more than 10,000 kPa, and more preferably not more than 8,500 kPa, and a ratio P2/P1 of the above-described P1 and the rupturing pressure (P2) of the seal tape 27 covering the gas discharging port 26b is set to 1.1 to 1.5 and more preferably 1.2 to 1.4. Such a difference in rupturing pressure occurs because the gas discharging ports 26a and 26b having different opening diameters (opening areas) are closed by the same seal tape 27.

Incidentally, instead of the embodiment shown in FIG. 1, an inflator employing a method in which the opening diameters (opening areas) of the gas discharging ports 26a, 26b, and 26c are equal and the respective ports are closed by seal tapes having different rupturing strength (for example, made different in thickness, material or size) can be used, or an inflator employing a method in which the opening diameters and the rupturing strengths of the seal tape are combined may be used.

EXAMPLE

The present invention will be explained in detail on the basis of an example, but the present invention is not limited to such an example. Tank combustion tests in example and comparative example are conducted as follows:

Tank Combustion Test

A gas generator is fixed in an SUS (stainless steel) tank having an inner volume of 60 liters and is connected to an outer ignition electric circuit after sealing the tank at a room temperature (20° C.). The time when an ignition electric circuit current is applied (an ignition current is applied) is set as 0, and a change in pressure increase inside the tank is measured for the period between 0 and 200 milliseconds by a pressure transducer independently placed in the tank. Each of the measured data is obtained finally as a tank pressure/time curve by a computer process, which is a curve estimating an operation performance of the gas generator (hereinafter, referred to as a "tank curve"). Further, a pressure transducer is also provided in the housing of the gas generator, and a change in pressure increase inside the housing is measured for the period between 0 and 200 milliseconds simultaneously with measurement of the change in pressure increase inside the tank, and a housing internal pressure/time curve (hereinafter, referred to as "a combustion internal curve") is finally obtained.

Example 1

A gas generator having the structure shown in FIG. 1 was manufactured. Incidentally, details of respective constituent elements of the gas generator are as follows:

Shape of a gas generating agent: a single-perforated cylindrical shape [an outer diameter of 2.7 mm, an inner diameter (d) of 0.8 mm, a length (L) of 4 mm and L/d=5]

Composition of the gas generating agent: nitroguanidine/strontium nitrate/sodium carboxymethylcellulose/acid clay= 34.4/49.5/9.4/6.7

Amount of the gas generating agent: 33.5 g in the first combustion chamber, 7.7 g in the second combustion chamber Seal tape: an aluminum tape (a thickness of 80 $\mu$m, trade name AT-80, manufactured by NITTO DENKO CORPORATION and a tensile strength of 7.65 kg/mm$^2$)

Gas discharging port: four ports having a diameter of 3.3 mm, six ports having a diameter of 2.4 mm and ten ports having a diameter of 1.8 mm.

Rupturing pressure (P1) of a seal tape (a seal tape closing the gas discharging port having a diameter of 3.3 mm) first ruptured by activation of the first-stage igniter (the first igniter): 74 kPa (a calculated value)

Rupturing pressure (P2) of a seal tape (a seal tape closing the gas discharging port having a diameter of 2.4 mm) ruptured with a delay by activation of the first-stage igniter (the first igniter): 102 kPa (a calculated value)

P2/P1: 1.38

Figure 2:
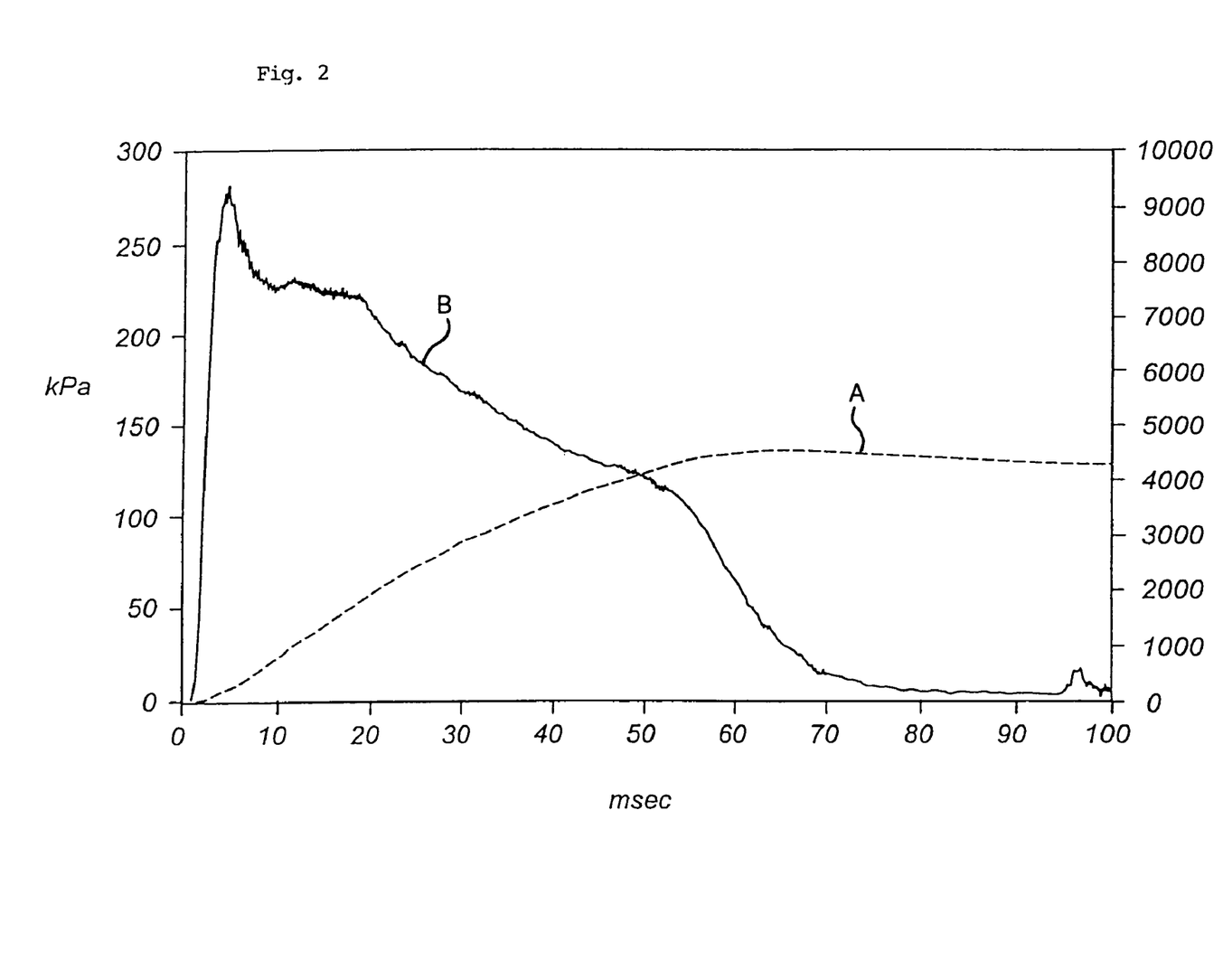
FIG. 2 is a diagram showing a tank curve (a broken line; only a first-stage igniter is activated) and a combustion internal pressure curve (a solid line) obtained by a 60-liter tank test in Embodiment 1.
Figure 3:
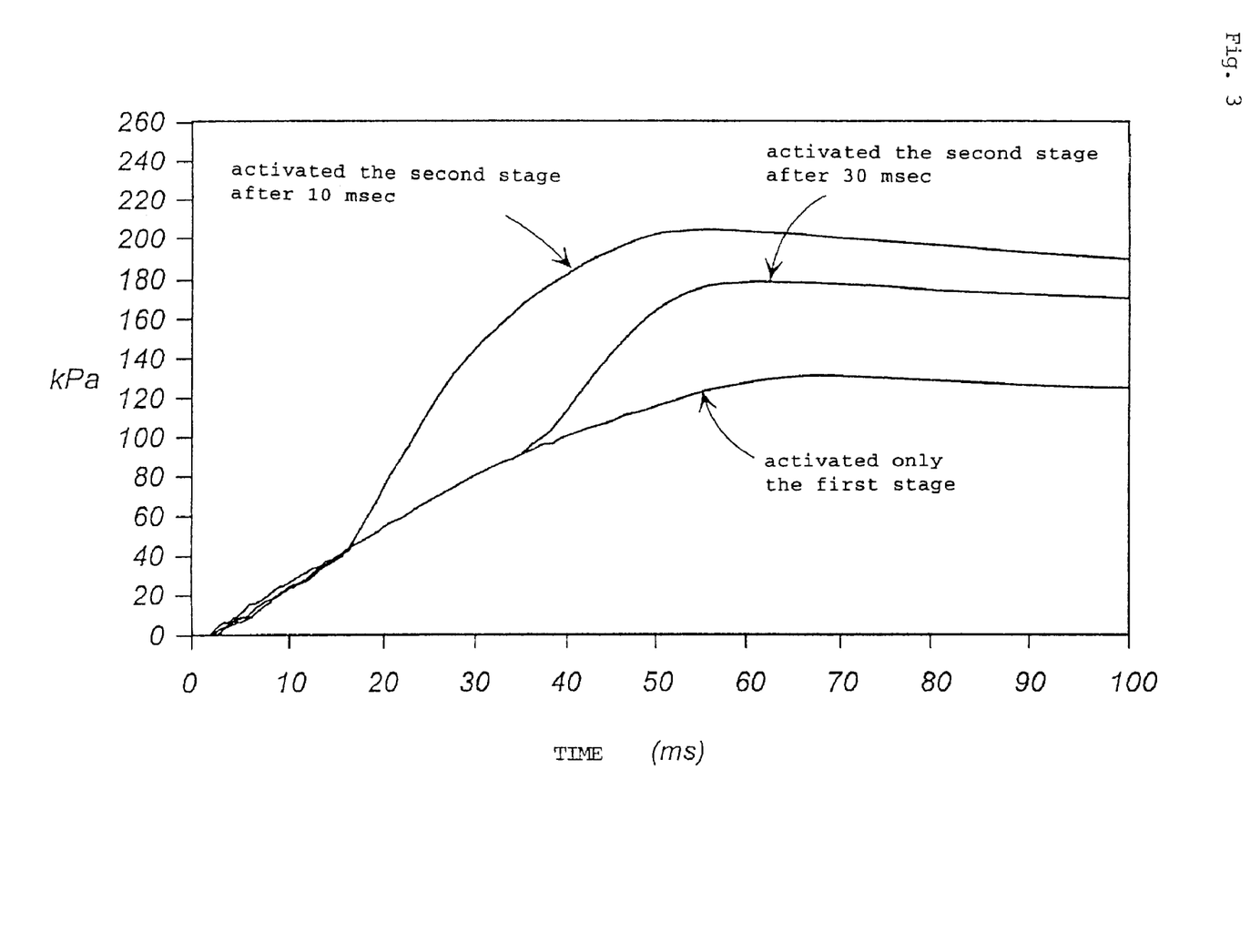
FIG. 3 is a diagram showing a tank curve (the first-stage and second-stage igniters are ignited) obtained by the 60-liter tank test in Embodiment 1.
Figure 4:
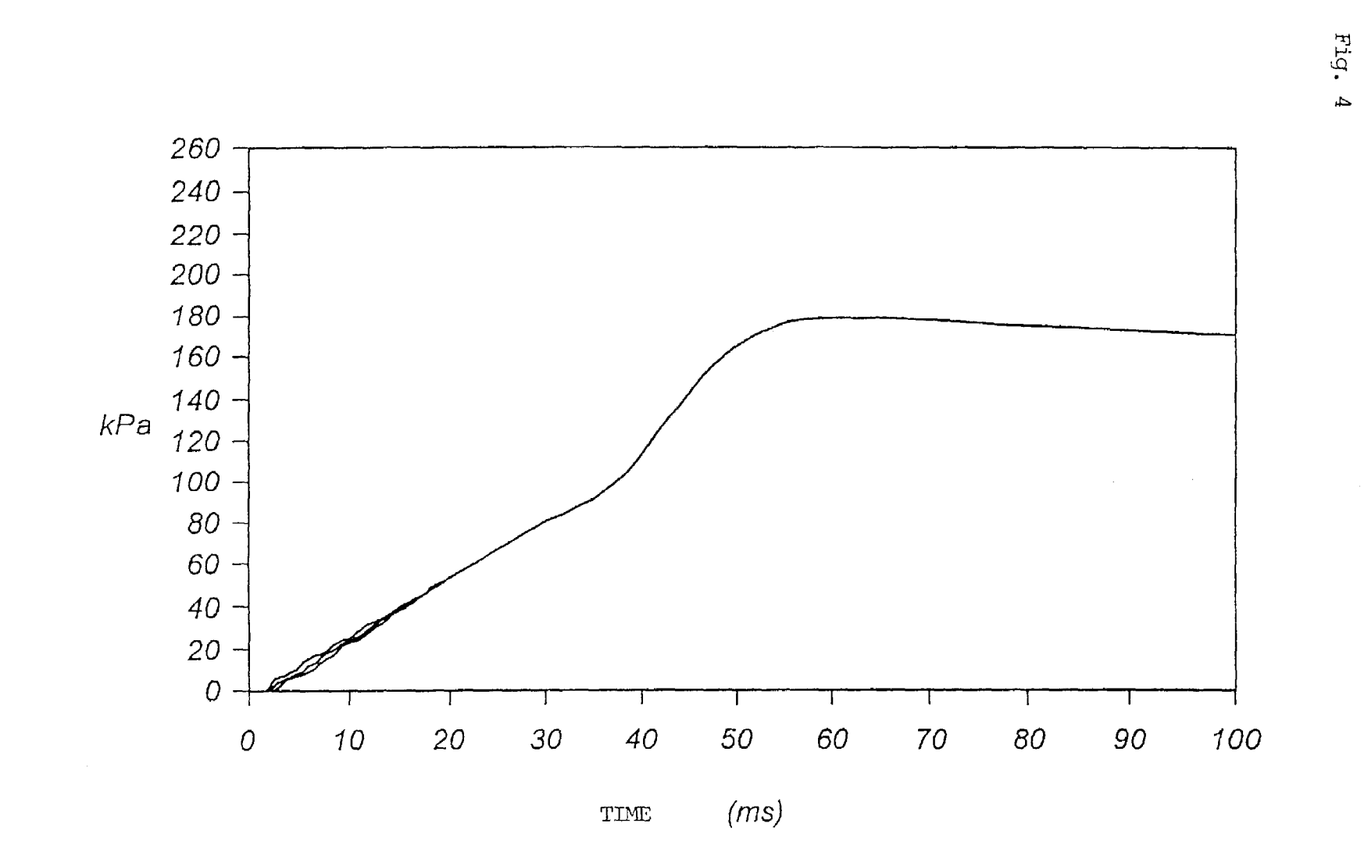
FIG. 4 is a diagram showing a tank curve the first-stage and second-stage igniters are ignited) obtained by the 60-liter tank test in the Embodiment 1.

Using this gas generator, a predetermined number of 60-liter tank combustion tests were conducted. FIG. 2 shows both a tank curve A and a combustion internal pressure curve B in the tank combustion test when only the first-stage igniter was activated. FIG. 3 shows both tank curves obtained when the second-stage igniter was activated after 10 milliseconds and after 30 milliseconds from the activation of the first-stage igniter. FIG. 4 shows a tank curve obtained when the second-stage igniter was activated after 30 milliseconds from the activation of the first-stage igniter.

As apparent from FIG. 2, when only the first-stage igniter was activated, Pmax was 135 kPa and the tank curve showed a linear rising. The tank pressure at the time of 0.5×Tpmax was about 90 kPa and it was in the range of 0.55×Tpmax to 0.75×Tpmax.

As apparent from FIG. 3, $\Delta P\ 30/\Delta P\ 10$ was about 0.69 (= 5.24 kPa/7.64 kPa) and it satisfied the formula (I).

As apparent from FIG. 4, $\Delta P\ 30\text{–}40/\Delta P\ 20\text{–}30$ was about 1.25 (=3.28 kPa/2.62 kPa) and it satisfied the formula (II).

Comparative Example 1

A gas generator having the same constitution elements as those of the gas generator in Example 1 except that the length (L) of the gas generating agent was 2 mm and L/d=2.5 was obtained.

Figure 5:
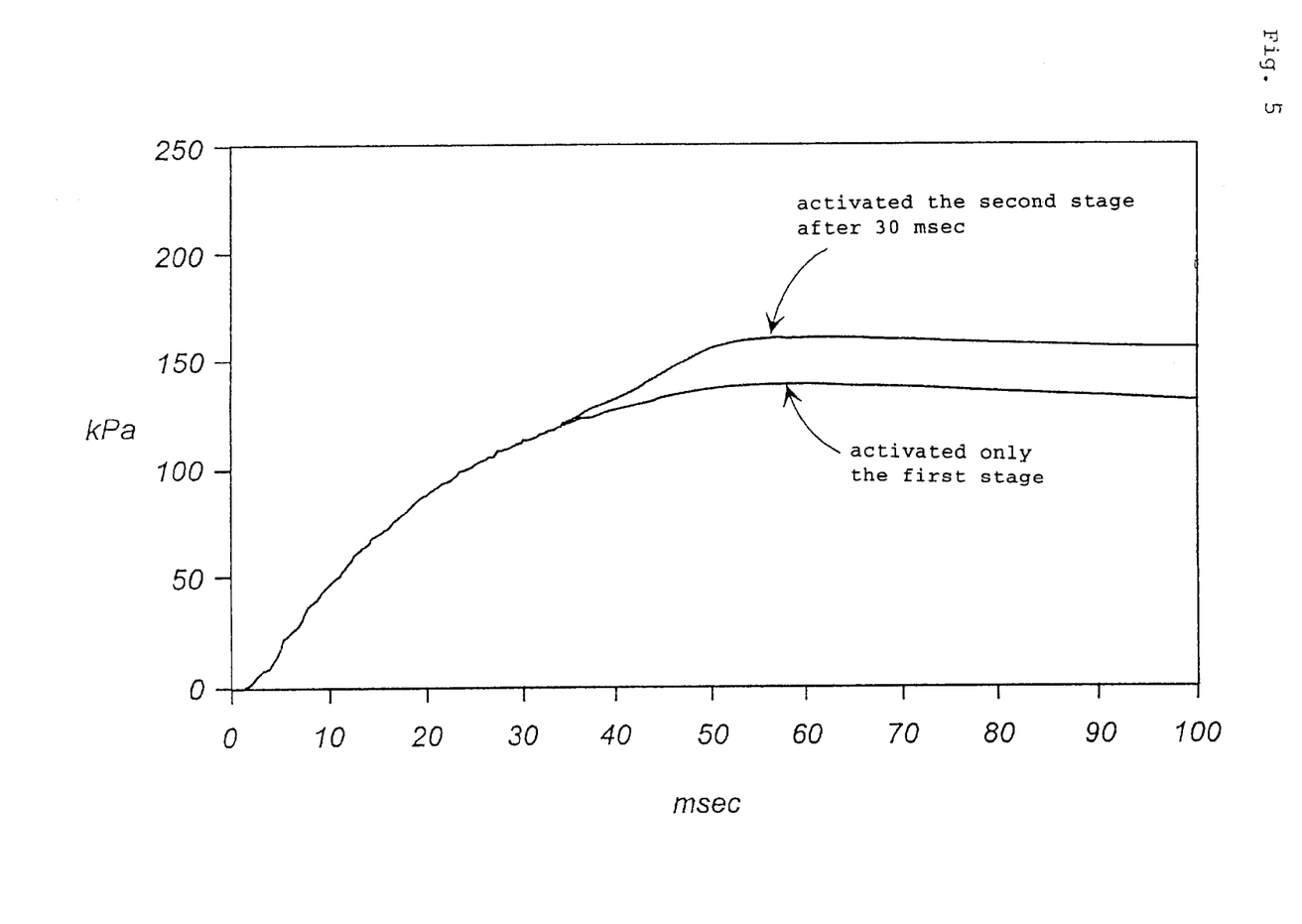
FIG. 5 is a diagram showing a tank curve (only a first-stage igniter is activated) and a combustion internal pressure curve obtained by a 60-liter tank test in Comparative Example 1.

Using this gas generator, the same 60-liter tank test as Example 1 was conducted. FIG. 5 shows both of a tank curve in a tank combustion test obtained when only the first-stage igniter was activated and a tank curve obtained when the second-stage igniter was activated after 30 milliseconds from the activation of the first-stage igniter.

Figure 6:
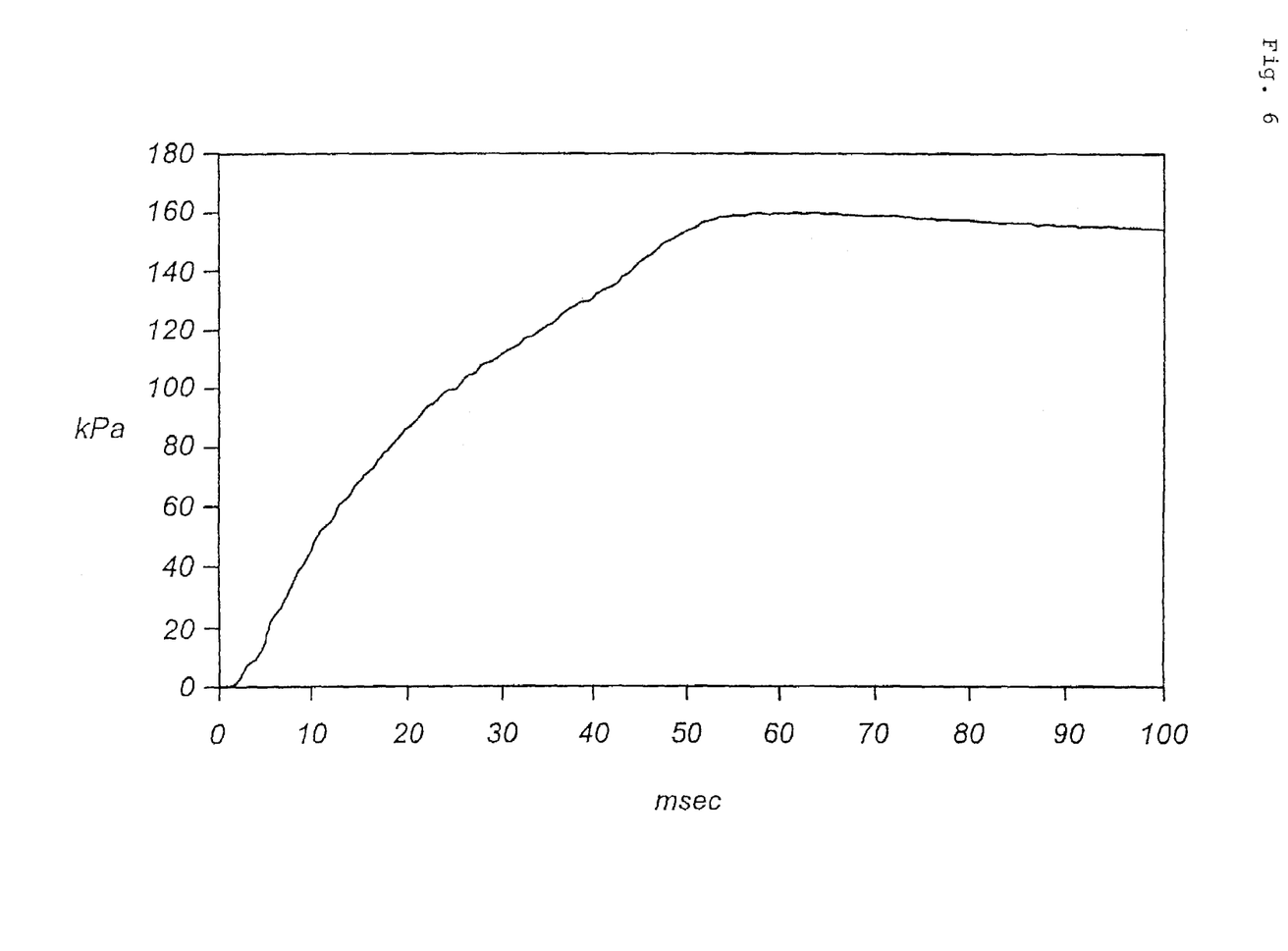
FIG. 6 is a diagram showing a tank curve (the first-stage and second-stage igniters) obtained by the 60-liter tank test in the Comparative Example 1.

FIG. 6 shows a tank curve obtained when the second-stage igniter was activated after 30 milliseconds from the activation of the first-stage igniter.

As apparent from FIG. 5, when only the first-stage igniter was activated, the tank curve showed an sudden rising, Pmax was 136 kPa, the tank pressure was 108 kPa at the time of 0.5×Tpmax and it was out of the range of 0.55×Tpmax to 0.75×Tpmax.

As apparent from FIG. 6, $\Delta P\ 30\text{--}40/\Delta P\ 20\text{--}30$ was 0.756 and it did not satisfy the formula (II).

As apparent from the above respective measured numerical values and comparison of FIG. 2 to FIG. 4 and FIG. 5 and FIG. 6, when Example 1 and Comparative Example 1 are compared with each other, it is shown that the degree of rising of the first stage tank curve in Example 1 is more moderate and linear. Even when the first-stage and second-stage igniters are activated, a rising rate of the pressure is not so rapid regardless of the staggered timing of the activations and further, only a little change in the rising rate is observed.

What is claimed is:

1. A gas generator for an air bag, comprising:
    a housing having a plurality of gas generating ports closed by a seal tape, the ports including a first port adapted to be opened by rupturing the seal tape and a second port adapted to be opened by rupturing the seal tape;
    a first combustion chamber and a second combustion chamber provided inside the housing;
    gas generating agents accommodated inside the first combustion chamber and the second combustion chamber, each gas generating agent being cylindrical in shape having at least a single hole in the longitudinal direction thereof, and a ratio L/d of an inner diameter (d) and a length (L) of the holes being L/d>3.5;
    a first stage igniter for igniting and burning gas generating agents accommodated in the first combustion chamber, the first stage igniter being adapted to rupture the seal tape covering the first port;
    a second stage igniter for igniting and burning gas generating agents accommodated in the second combustion chamber and being adapted to rupture only the seal tape covering the second port, the second stage igniter being adapted to be ignited with a time-lag,
    wherein when the first-stage igniter is ignited, a portion of the seal tape is first ruptured and another part of or all of the unruptured seal tape is ruptured with a delay, and a ratio (P2/P1) of a rupturing pressure (P1) at which the seal tape is first ruptured and a rupturing pressure (P2) at which the seal tape is ruptured with delay is 1.1 to 1.5.

2. A gas generator for an air bag according to claim 1, wherein each of the gas generating agents are cylindrical in shape at least one through holes formed in a longitudinal direction thereof.

3. A gas generator for an air bag according to claim 1 or 2, wherein the P2/P1 is 1.2 to 1.4.

4. A gas generator for an air bag according to claim 1 or 2, wherein the rupturing pressure (P1) at which the seal tape first is ruptured is not more than 10,000 kPa.

5. A gas generator for an air bag according to claim 1 or 2, wherein the rupturing pressure (P1) at which the seal tape first is ruptured is not more than 8,500 kPa.

6. A gas generator for an air bag according to claim 1 or 2, wherein the L/d≧5.

7. A gas generator for an air bag, wherein a gas generator for an air bag according to claim 1 or 2 is adjusted to the temperature of 20° C. and placed in a sealed system with a volume of 60 liters, and only the first-stage igniter is ignited and only the gas generating agent stored in one of the combustion chambers is ignited and burnt, and at that time, a pressure in the sealed system at the time of 0.5×Tpmax from the time when an ignition current is applied is 0.55×Pmax to 0.75×Pmax, where a period up to the peak of the pressure when the internal pressure of the sealed system becomes the maximum from the time when the igniter is activated is Tpmax, and a pressure inside the sealed system at the peak of the pressure is Pmax.

8. A gas generator for an air bag, wherein a gas generator for an air bag according to claim 1 or 2 is adjusted to the temperature of 20° C. and placed in a sealed system with a volume of 60 liters, and only the first-stage igniter is ignited and only the gas generating agent stored in one of the combustion chambers is ignited and burnt, and then, the second-stage igniter is ignited 10 milliseconds or 30 milliseconds after an ignition current is applied the activate the former igniter, and the gas generating agent of the other combustion chamber is ignited and burnt, and at that time, a condition of the change in the pressure inside sealed system after the first-stage and second-stage igniters are ignited satisfies the following the formula (I):

$$0.5 \leq \Delta P30/\Delta P10 \leq 1 \qquad (I)$$

where $\Delta$ P10 represents an amount of pressure change for 10 milliseconds from a time when the second-stage igniter is activated 10 milliseconds after activation of the first-stage igniter, and $\Delta$ P30 represents an amount of pressure change for 10 milliseconds from a time when the second-stage igniter is activated 30 milliseconds after the activation of the first-stage igniter.

9. A gas generator for an air bag, wherein a gas generator for an air bag according to claim 1 or 2 is adjusted to the temperature of 20° C. and placed in a sealed system with a volume of 60 liters, and only the first-stage igniter is ignited and only the gas generating agent stored in one of the combustion chambers is ignited and burnt, and then, the second-stage igniter is ignited 30 milliseconds after the activation of the former igniter, and the gas generating agent of the other combustion chamber is ignited and burnt, and at that time, a condition of the change in the pressure inside sealed system after the first-stage and second-stage igniters are ignited satisfies the following the formula (II):

$$1.1 < \Delta P30\text{--}40/\Delta P20\text{--}30 < 1.4 \qquad (II)$$

where, $\Delta P20\text{--}30$ represents an absolute value of an amount of pressure change in the sealed system for 20 to 30 milliseconds after the activation of the first-stage igniter, and $\Delta P30\text{--}40$ represents an absolute value of an amount of pressure change in the sealed system for 30 to 40 milliseconds after activation of the first-stage igniter.

10. A gas generator for an air bag, comprising:
    a housing having a plurality of gas discharging ports closed by a seal tape, the ports including a first port adapted to be opened by rupturing the seal tape and a second port adapted to be opened by rupturing the seal tape;
    a first combustion chamber and a second provided inside the housing;

gas generating agents accommodated inside the first combustion chamber and the second combustion chamber;

two igniters to ignite and burn the gas generating agents stored in the two combustion chambers;

a first stage igniter for igniting and burning gas generating agents accommodated in the first combustion chamber, the first stage igniter being adapted to rupture the seal tape covering the first port;

a second stage igniter for igniting and burning gas generating agents accommodated in the second combustion chamber, the second stage igniter being adapted to rupture only the seal tape covering the second port, the first stage igniter and the second stage igniter being adapted to be activated with a time-lag, wherein when the gas generator is adjusted to the temperature of 20° C. and placed in a sealed system, and only the first-stage igniter is ignited to burn and ignite gas generating agents accommodated in the first combustion chamber, a pressure in the sealed system at the time of $0.5 \times Tpmax$ from the time when the ignition current is applied is $0.55 \times Pmax$ to $0.75 \times Pmax$ if a period up to the peak when the internal pressure of the sealed system becomes the maximum from the time when the igniter is activated is Tpmax, and a pressure inside the sealed system at the peak of the pressure is Pmax.

11. An air bag system, comprising:

a gas generator for an air bag according to claim 1 or 10;

an impact sensor which detects an impact to actuate the gas generator;

an air bag which introduces a gas generated in the gas generator to inflate; and a module case which accommodates the air bag.

* * * * *